J. H. Webster,
Globe Valve,
Nº 66,757. Patented July 16, 1867.
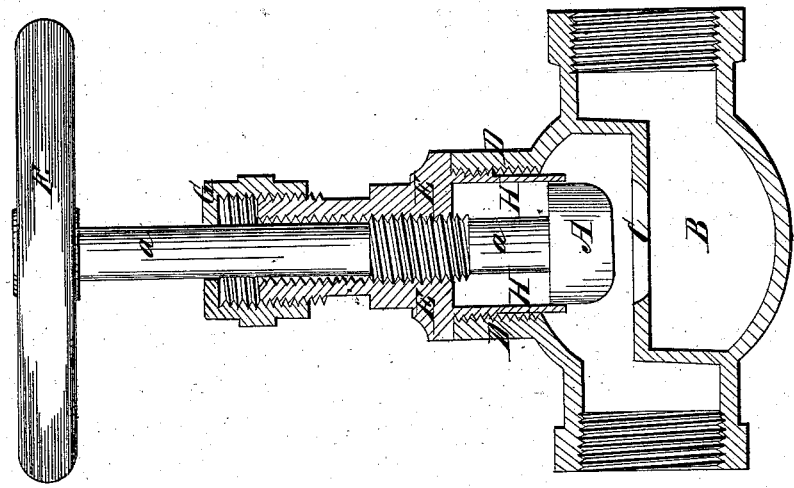
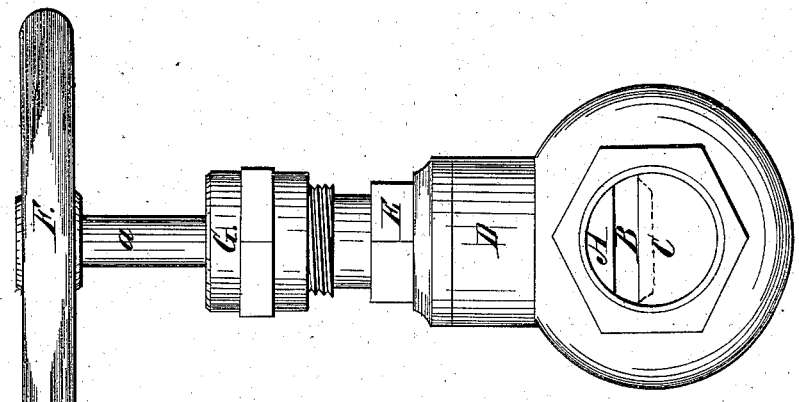
Witnesses:
Edward T. Flint,
C. Delafield.
Inventor:
Joseph H. Webster

United States Patent Office.

JOSEPH H. WEBSTER, OF ST. LOUIS, MISSOURI, ASSIGNOR TO HIMSELF AND JOHN KUPFERLE, OF THE SAME PLACE.

Letters Patent No. 66,757, dated July 16, 1867.

IMPROVEMENT IN STEAM GLOBE-VALVES.

*The Schedule referred to in these Letters Patent and making part of the same.*

TO ALL WHOM IT MAY CONCERN:

Be it known that I, JOSEPH H. WEBSTER, of the city and county of St. Louis, and State of Missouri, have invented certain new and useful improvements in Steam-Valves; and I do hereby declare the following to be a full, clear, and exact description of the same, reference being had to the annexed drawing, making part of this specification, in which—

Figure 1 is a plane elevation of what is known as a globe steam-valve, with my improvements applied thereto; and Figure 2 is a longitudinal section through the same.

My invention relates to and is an improvement upon what is known as a globe steam-valve, and consists of a bonnet, or valve steam-guide, for this variety of valve, made in such form and proportion with respect to the valve-seat, valve, and stem, as to enable me to use it as a guide to grind in the valve by whenever that may be necessary, and so as to enable it to perform all of the functions of the ordinary bonnet or valve steam-guide with which these valves are usually fitted.

These bonnets are usually made with a short screw-shank, to fit in a corresponding thread cut in the nozzle D; and the neck is made just long enough to allow room for the stuffing-box G, and square sides, by which to screw it in its place with a wrench; so that when the valve is to be ground in, the bonnet has to be taken off, the valve-stem taken out, and a separate cap made to fit on or over the nozzle D for the stem to pass through before the valve can be accurately ground in its seat. Now, to avoid this trouble, not only in the manufacture of this valve, but also in grinding them after they have been used and become leaky, is the object of my invention. And this object I accomplish by making a long, hollow shank, H, on the lower end of the bonnet E, making the cavity in the shank big enough for the valve A to enter when raised up off its seat. The outside of this shank I leave plain, all excepting a short distance close under the shoulder of the bonnet, where I cut a short thread, say one-third of the length of the shank, measuring from the shoulder down, making the blank part of the shank just large enough to slip in the nozzle over the top of the thread cut therein, as shown in the drawing. Through the centre of the bonnet I cut a screw-thread the entire length for the valve-stem to travel in, after the usual method; but instead of cutting a long thread on the valve-stem, I make that thread quite short, and make it on the lower part of the stem, so that when the valve is down in its seat there will be but three or four threads of the screw on the valve-stem entered in the female screw of the bonnet. By these means, if the valve be screwed down in its seat C, and the bonnet E be screwed out of its socket D, it will also be screwed off of the thread on the valve-stem; the plain part only of the shank H will then set in the socket D, and the valve will be left free to turn, unaffected by the screw. Now I have got the bonnet detached from the nozzle D, and free to slip up and down on the valve-stem. Now, by putting emery or sand on the valve, and setting the plain part of the shank in the nozzle, the valve may be ground in its seat, the bonnet acting as a guide to the stem.

Having now described the nature and extent of my invention, I claim, and desire to secure by Letters Patent—

The bonnet E, constructed with a blank end on the shank H, and arranged in relation to the valve, valve-stem, and seat, substantially as described for the purpose specified.

JOSEPH H. WEBSTER.

Witnesses:
HENRY B. KERONE,
L. DICKENSON.